United States Patent
Dohi et al.

(10) Patent No.: US 9,702,781 B2
(45) Date of Patent: Jul. 11, 2017

(54) LEAKAGE DETECTION DEVICE AND FLUID CONTROLLER INCLUDING SAME

(71) Applicant: FUJIKIN INCORPORATED, Osaka-shi (JP)

(72) Inventors: Ryousuke Dohi, Osaka (JP); Tsutomu Shinohara, Osaka (JP); Kouji Nishino, Osaka (JP); Toshio Doh, Osaka (JP); Nobukazu Ikeda, Osaka (JP); Michio Yamaji, Osaka (JP)

(73) Assignee: FUJIKIN INCORPORATED, Oasaka-shi (JP)

( * ) Notice: Subject to any disclaimer, the term of this patent is extended or adjusted under 35 U.S.C. 154(b) by 0 days.

(21) Appl. No.: 14/409,121

(22) PCT Filed: Jul. 11, 2013

(86) PCT No.: PCT/JP2013/068941
§ 371 (c)(1),
(2) Date: Dec. 18, 2014

(87) PCT Pub. No.: WO2014/017305
PCT Pub. Date: Jan. 30, 2014

(65) Prior Publication Data
US 2015/0143876 A1 May 28, 2015

(30) Foreign Application Priority Data
Jul. 23, 2012 (JP) ................................ 2012-162244

(51) Int. Cl.
*G01M 3/24* (2006.01)

(52) U.S. Cl.
CPC .............. *G01M 3/24* (2013.01); *G01M 3/243* (2013.01)

(58) Field of Classification Search
CPC .................................. G01M 3/24; G01M 3/243
See application file for complete search history.

(56) References Cited

U.S. PATENT DOCUMENTS

| 4,823,600 A | * | 4/1989 | Biegel | G01M 3/243 |
|  |  |  |  | 73/40.5 A |
| 2007/0068225 A1 | * | 3/2007 | Brown | F16K 37/0075 |
|  |  |  |  | 73/40.5 A |
| 2010/0186521 A1 |  | 7/2010 | Bouzid |  |

FOREIGN PATENT DOCUMENTS

| CN | 101641575 A | 2/2010 |
| JP | 61-008850 U | 1/1986 |

(Continued)

OTHER PUBLICATIONS

International Search Report mailed Nov. 19, 2013, issued for PCT/JP2013/068941.

(Continued)

*Primary Examiner* — Paul West
(74) *Attorney, Agent, or Firm* — Locke Lord LLP

(57) ABSTRACT

There is provided a leakage detection device which can be reduced in size and attached to a leakage detection target member, such as a fluid controller, all the time, and thus, can monitor leakage of fluid all the time, and a fluid controller having the same. A fluid controller is configured by a fluid controller main body and a leakage detection device which is attached to the fluid controller main body. In the fluid controller main body, a leakage port for detecting the leakage is provided. The leakage detection device includes a sensor holding body which is attached to the fluid controller main body; an ultrasonic sensor which is held by the sensor holding body to face the leakage port; an ultrasonic passage provided between a sensor surface of the ultrasonic sensor and the leakage port; and a processing circuit for processing an ultrasonic wave obtained by the ultrasonic sensor.

2 Claims, 2 Drawing Sheets

(56) References Cited

FOREIGN PATENT DOCUMENTS

| JP | 02-291937 A | 12/1990 |
|----|-------------|---------|
| JP | 03-130637 A | 6/1991 |
| JP | 3142304 B2 | 3/2001 |
| JP | 2001-305005 A | 10/2001 |

OTHER PUBLICATIONS

Office Action dated Sep. 26, 2016, issued for the Chinese patent application No. 201380033899.0.

* cited by examiner

LEAKAGE DETECTION DEVICE AND FLUID CONTROLLER INCLUDING SAME

TECHNICAL FIELD

The present invention relates to a leakage detection device which detects leakage of fluid and a fluid controller including the same.

BACKGROUND ART

As a fluid controller which is provided with a leakage detection device, a fluid controller in which a vibration detector is attached to a fluid controller main body is known (refer to PTL 1).

In addition, as an apparatus which detects leakage of the fluid controller, an apparatus which uses an ultrasonic sensor is known (refer to PTL 2).

CITED REFERENCE

Patent Literature

PTL 1: JP-UM-A-61-8850
PTL 2: JP-A-2001-305005

SUMMARY

Technical Problem

In the above-described PTL 1, there is a problem in that the accuracy of leakage detection of fluid is not good. As in PTL 2, by using an ultrasonic sensor, the accuracy of leakage detection is improved. A leakage detection device in PTL 2 detects the leakage as necessary, but does not monitor the leakage all the time. In order to monitor the leakage all the time, it is necessary to have the leakage detection device attached to a fluid controller main body all the time. To do this, there is a problem in that it is necessary to reduce the size of the device.

An object of the present invention is to provide a leakage detection device which is reduced in size and can be attached to a leakage detection target member, such as a fluid controller, all the time, and thus, can monitor the leakage of the fluid all the time, and a fluid controller including the same.

Solution to Problem

The leakage detection device according to the present invention is a leakage detection device which detects the leakage of the fluid, and includes: a sensor holding body; an ultrasonic sensor which is held by the sensor holding body to face a leakage port that is provided in a leakage detection target member and causes a sealing part in the leakage detection target member and the outside to communicate with each other; an ultrasonic passage which is provided between a sensor surface of the ultrasonic sensor and the leakage port; and a processing circuit which processes an ultrasonic wave obtained by the ultrasonic sensor.

The fluid controller according to the present invention includes a fluid controller main body which controls the flow of fluid, and the leakage detection device which detects the leakage of the fluid in the fluid controller main body. In the fluid controller main body, a leakage port which causes a sealing part in the leakage controller main body and the outside to communicate with each other, is provided, in which the leakage detection device is the above-described leakage detection device.

For example, the fluid controller main body is a known diaphragm valve, and is generally provided with the leakage port for detecting the leakage. If the sealing property in the fluid controller main body is damaged due to damage to a diaphragm, or the like, the fluid leaks from the leakage port. Because of the leakage, an ultrasonic wave (approximately 40 kHz) is generated, and with the ultrasonic sensor, it is possible to detect the presence and the absence of generation of the ultrasonic wave, that is, the presence and the absence of the leakage. In the processing circuit, when the ultrasonic wave is continuously detected, an alarm is generated. The leakage detection device is attached so as to use the leakage port which is in an ultrasonic wave generation position. According to this, it is possible to detect the presence and the absence of the leakage with high precision, and to reduce the leakage detection device in size. The leakage detection device which is reduced in size can be easily attached to the fluid controller main body via the sensor holding body. In the fluid controller which is obtained in this manner, it is possible to monitor the leakage in the fluid controller all the time.

The above-described leakage detection device can employ any member if the member is provided with the leakage port. As another example of the leakage detection target member, a joint in which the leakage port is formed on a nut side surface is employed. The joint type is not particularly limited. The leakage detection device can be employed in various types of joints which use a nut provided with the leakage port, such as a joint sealed by using a gasket, or a joint fixed by using a ferrule (ring) or the like.

Advantageous Effects of Invention

According to the leakage detection device of the present invention, since the leakage port provided in the leakage detection target member is used, and the ultrasonic sensor faces the leakage port, the accuracy of leakage detection of fluid can be improved, and the ultrasonic sensor can be reduced in size. Accordingly, the ultrasonic sensor can be attached to the leakage detection target member all the time via the sensor holding body, and the leakage in the leakage detection target member can be monitored all the time.

Figure 1:
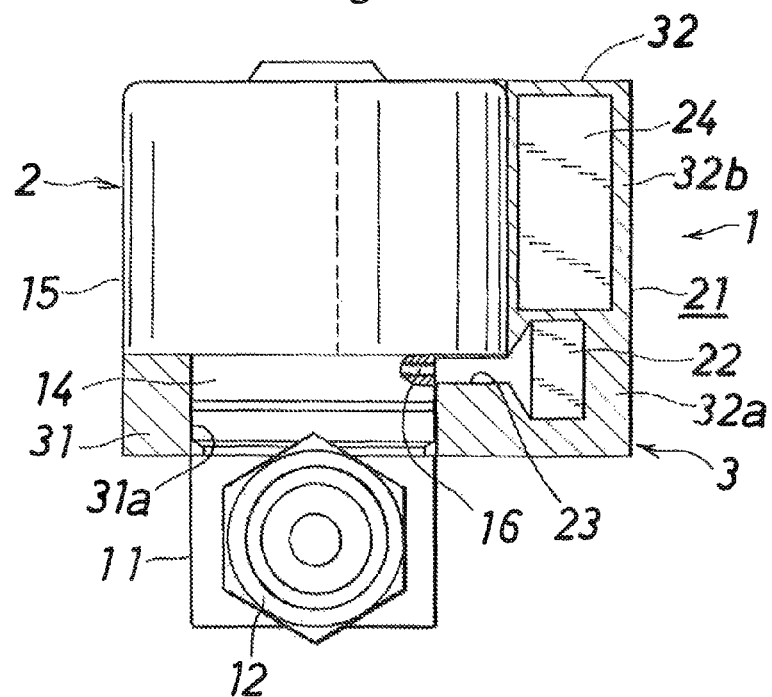
FIG. 1 is a side surface view which is cut out apart illustrating an embodiment of a leakage detection device and a fluid controller including the same according to the present invention.

REFERENCE SIGNS LIST (1): Fluid controller
(2): Fluid controller main body
(3): Leakage detection device
(16): Leakage port
(21): Sensor holding body
(22): Ultrasonic sensor
(23): Ultrasonic passage
(24): Processing circuit

DESCRIPTION OF EMBODIMENT

An embodiment of the present invention will be described with reference to the following drawings. In the description below, upper and lower sides and right and left sides are the upper and lower sides and the right and left sides of FIG. 1.

Figure 2:
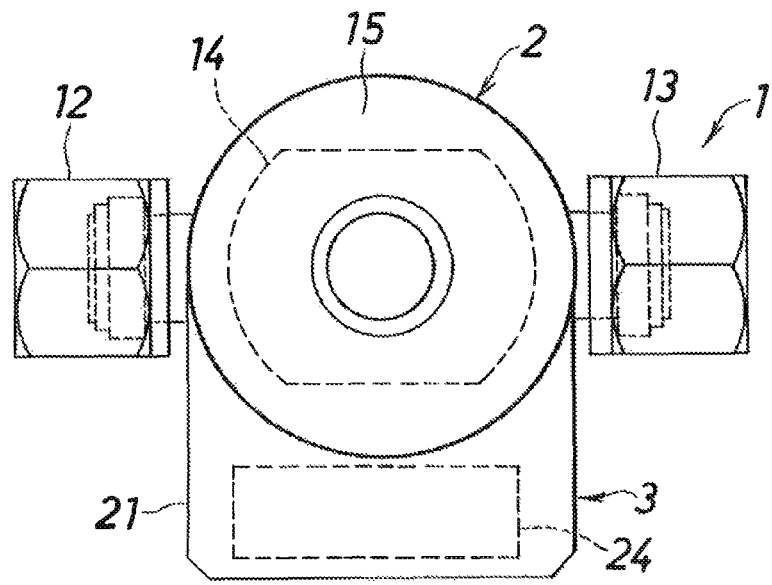
FIG. 2 is a plan view of FIG. 1.

As illustrated in FIGS. 1 and 2, a fluid controller (1) is configured of a fluid controller main body (leakage detection target member) (2) which controls (opens a blockage, adjusts flux, or the like) the flow of fluid, and a leakage detection device (3) which detects leakage of the fluid in the fluid controller main body (2).

Figure 3:
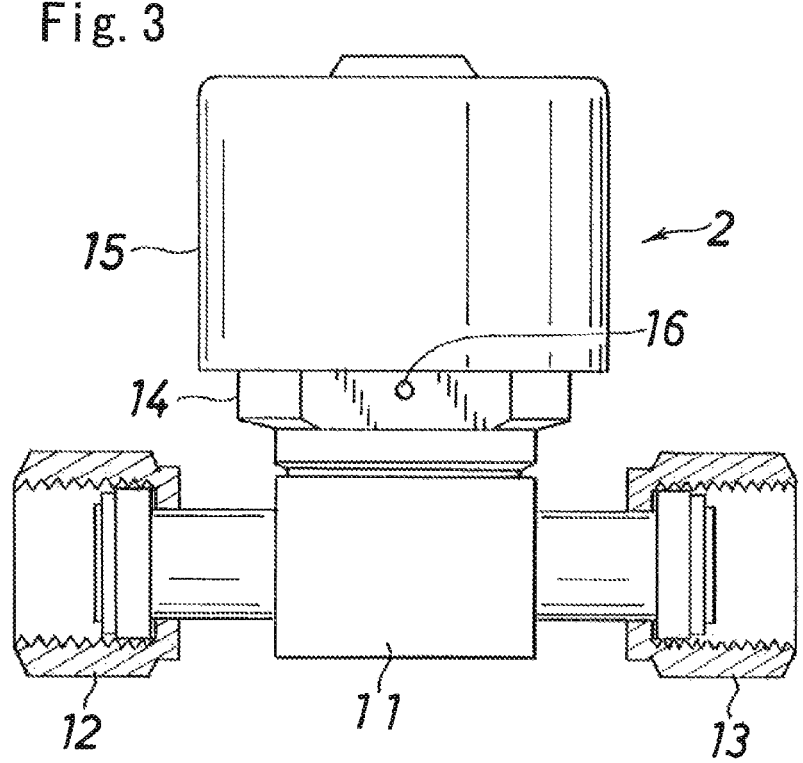
FIG. 3 is a front view of a fluid controller main body.

The fluid controller main body (2) is a known diaphragm valve, and an internal configuration thereof is omitted. However, as illustrated in FIG. 3, the fluid controller main body (2) includes: a body (11) provided with an inlet tube joint portion (12) and an outlet tube joint portion (13); a bonnet (14) in a substantially cylindrical shape which is fitted to an upper portion of the body (11); and a casing (15) which is attached to an upper side of the bonnet (14).

In the bonnet (14) of the fluid controller main body (2), a leakage port (16), which causes a sealing part in the fluid controller main body and the outside to communicate with each other, and detects the leakage, is provided.

The leakage detection device (3) detects the leakage from the leakage port (16) provided in the fluid controller main body by using the ultrasonic sensor, and the leakage detection device (3) includes: a sensor holding body (21) which is attached to the fluid controller main body (2); an ultrasonic sensor (22) which is held by the sensor holding body (21) to face the leakage port (16) at a predetermined interval; an ultrasonic passage (23) in a straight line shape provided between a sensor surface of the ultrasonic sensor (22) and the leakage port (16); and a processing circuit (24) for processing an ultrasonic wave obtained by the ultrasonic sensor (22).

Figure 4:
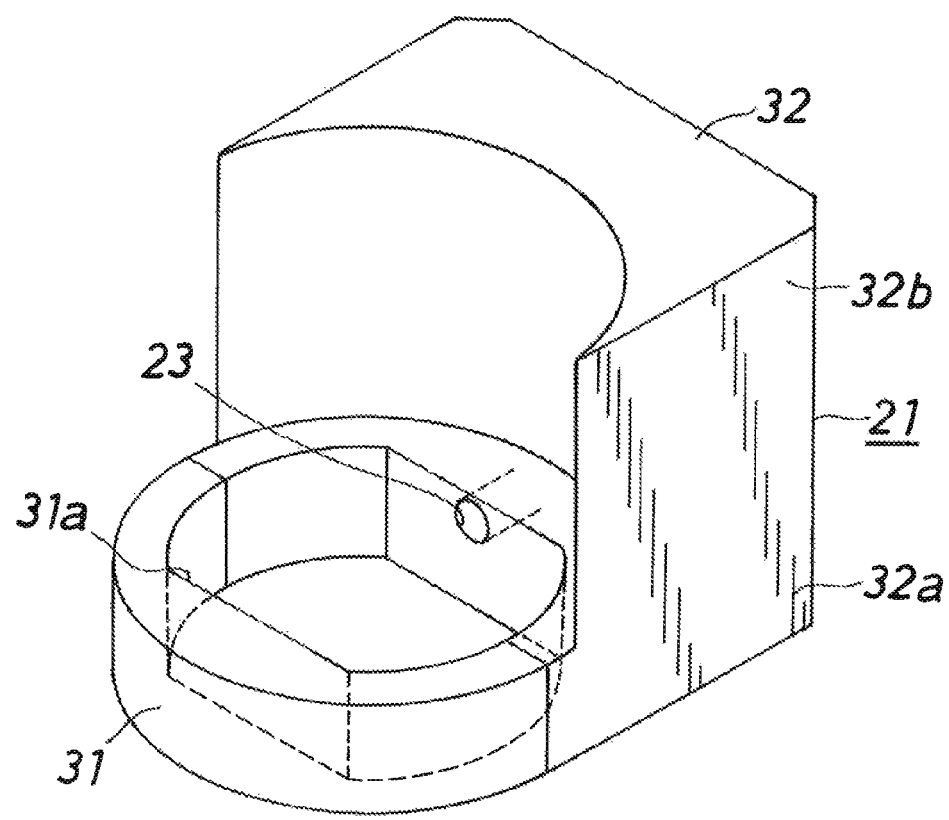
FIG. 4 is a perspective view of a sensor holding body of the leakage detection device.

As illustrated in FIG. 4, the sensor holding body (21) is configured of a horizontal portion (31) provided with a through hole (31a) that is fitted into the bonnet (14) and a vertical portion (32) which abuts the bonnet (14) and the casing (15) from a side surface thereof. At a lower portion 32a of the vertical portion (32) of the sensor holding body (21), the ultrasonic sensor (22) is provided, and on an upper portion (32b) of the vertical portion (32) of the sensor holding body (21), the processing circuit (24) is provided. The sensor holding body (21) can be attached to be freely attachable to and detachable from the existing fluid controller main body (2). As necessary, the sensor holding body (21) is divided into a plurality of members, and is assembled by being attached with a screw or the like.

The ultrasonic sensor (22) can measure the size of the ultrasonic wave of a frequency of approximately 40 kHz. The sensor surface of the ultrasonic sensor (22) faces the leakage port (16) via the ultrasonic passage (23).

The processing circuit (24) processes the output of the ultrasonic sensor (22), and when the ultrasonic wave is continuously detected, it is determined that the leakage is generated and an alarm is generated.

According to the fluid controller (1) of the embodiment, if a sealing property in the fluid controller main body (2) is damaged due to damage to a diaphragm, or the like, the fluid leaks from the leakage port (16). Because of the leakage, an ultrasonic wave (approximately 40 kHz) is generated, and with the ultrasonic sensor (22), it is possible to detect the presence and the absence of generation of the ultrasonic wave, that is, the presence and the absence of the leakage. The leakage detection device (3) is attached so as to use the leakage port (16) which is in an ultrasonic wave generation position. According to this, it is possible to detect the presence and the absence of the leakage with high precision. Therefore, it is possible to detect the leakage even without increasing the ultrasonic sensor (22) in size and to reduce the leakage detection device (3) in size. The leakage detection device (3) which is reduced in size can be easily attached to the fluid controller main body (2) via the sensor holding body (21). In the fluid controller (1) which is obtained in this manner, it is possible to monitor the leakage in the fluid controller (1) all the time.

In addition, in the description above, the diaphragm valve is illustrated as an example of the fluid controller main body (2). However, the fluid controller main body (2) is not limited thereto. The fluid controller main body (2) may be any member which performs various fluid controls, and if the member is provided with the leakage port (16) for detecting the leakage, a shape or the like thereof is not limited. The sensor holding body (21) is made in a shape which is appropriate for the fluid controller main body (2). The leakage port (16) may be provided by post-processing at an appropriate position of the fluid controller main body (2).

In addition, in a nut which is used in the joint provided in the middle of the arranged tube, the leakage port is generally provided on a side surface thereof. The leakage detection device (3) can be employed in the joint which is provided with the nut.

The joint in this case includes: a tube joint main body which has first and second joint members which communicate with each other and have a fluid passage, sealing means that seals a butting portion of both joint members, and a nut which combines the joint members with each other; and the leakage detection device (3) which detects the leakage of the fluid in the joint main body. In the nut, the leakage port (16) which causes the sealing part in the tube joint main body and the outside to communicate with each other is provided. The leakage detection device (3) includes: the sensor holding body (21) which is attached to the nut; the ultrasonic sensor (22) which is provided in the sensor holding body (21) facing the leakage port (16); the ultrasonic passage (23) which is provided between the sensor surface of the ultrasonic sensor (22) and the leakage port (16); and the processing circuit (24) for processing the ultrasonic wave obtained by the ultrasonic sensor (22).

INDUSTRIAL APPLICABILITY

According to the present invention, it is possible to reduce a leakage detection device in size and attach the device to a leakage detection target member, such as a fluid controller, all the time, and thus, to monitor leakage of fluid all the time. Therefore, it is possible to contribute to solving a problem due to the leakage of the fluid.

The invention claimed is:
1. A leakage detection target and a leakage detection device which detects leakage of fluid of the leakage detection target, the leakage detection device comprising:
   a sensor holding body;
   an ultrasonic sensor which is held by the sensor holding body to face a leakage port that is provided in a leakage detection target member and causes a sealing part in the leakage detection target member and the outside to communicate with each other;
   an ultrasonic passage configured for alignment with the leakage port in a straight line between a sensor surface of the ultrasonic sensor and the leakage port; and a processing circuit which processes an ultrasonic wave obtained by the ultrasonic sensor, and the leakage port is provided for detecting a leakage and is not used as a fluid passage of the leakage detection target.

2. A fluid controller, comprising:

a fluid controller main body which controls the flow of fluid; and a leakage detection device which detects leakage of the fluid in the fluid controller main body, wherein, in the fluid controller main body, a leakage port which causes a sealing part in the fluid controller main body and the outside to communicate with each other, is provided, and the leakage port is provided for detecting a leakage and is not used as a fluid passage of the fluid controller, and wherein the leakage detection device comprises:

a sensor holding body;

an ultrasonic sensor which is held by the sensor holding body to face the leakage port;

an ultrasonic passage configured for alignment with the leakage port between a sensor surface of the ultrasonic sensor and the leakage port; and a processing circuit which processes an ultrasonic wave obtained by the ultrasonic sensor.

* * * * *